US012773671B2

(12) United States Patent
Cho et al.

(10) Patent No.: US 12,773,671 B2
(45) Date of Patent: Oct. 27, 2026

(54) HYDROGEN GENERATOR

(71) Applicant: BIO FRIENDS INC., Daejon (KR)

(72) Inventors: Wonjun Cho, Gyeonggi-do (KR); Jeseol Lee, Daejeon (KR); Youngsoo Lee, Chungcheongbuk-do (KR); Wonaje Cho, Seoul (KR); Hyejin Yu, Daejeon (KR); Junwoo Lee, Daejeon (KR); Jeongil Lee, Gyeonggi-do (KR)

(73) Assignee: BIO FRIENDS INC., Daejeon (KR)

( * ) Notice: Subject to any disclaimer, the term of this patent is extended or adjusted under 35 U.S.C. 154(b) by 752 days.

(21) Appl. No.: 18/274,366

(22) PCT Filed: Mar. 18, 2022

(86) PCT No.: PCT/KR2022/003807

§ 371 (c)(1),
(2) Date: Jul. 26, 2023

(87) PCT Pub. No.: WO2022/211334

PCT Pub. Date: Oct. 6, 2022

(65) Prior Publication Data

US 2024/0075442 A1 Mar. 7, 2024

(30) Foreign Application Priority Data

Mar. 29, 2021 (KR) ........................ 10-2021-0040163

(51) Int. Cl.
*B01J 8/06* (2006.01)
*B01J 21/04* (2006.01)
(Continued)

(52) U.S. Cl.
CPC ............... *B01J 8/065* (2013.01); *B01J 8/062* (2013.01); *B01J 21/04* (2013.01); *B01J 23/83* (2013.01); *C01B 3/326* (2013.01); *B01J 2208/00194* (2013.01); *B01J 2208/00504* (2013.01); *B01J 2208/065* (2013.01); *C01B 2203/0233* (2013.01); *C01B 2203/066* (2013.01); *C01B 2203/0811* (2013.01); *C01B 2203/0833* (2013.01); *C01B 2203/1076* (2013.01); *C01B 2203/1082* (2013.01); *C01B 2203/1211* (2013.01)

(58) Field of Classification Search
None
See application file for complete search history.

(56) References Cited

U.S. PATENT DOCUMENTS

2019/0375634 A1 12/2019 Finnerty et al.

FOREIGN PATENT DOCUMENTS

JP 06-219705 A 8/1994
JP 2001-114502 A 4/2001
(Continued)

OTHER PUBLICATIONS

International Search Report from corresponding Patent Application No. PCT/KR2022/003807 dated Jul. 4, 2022.

*Primary Examiner* — Jelitza M Perez
(74) *Attorney, Agent, or Firm* — Christensen, Fonder, Dardi, Busse; Diane E. Bennett; Peter S. Dardi

(57) ABSTRACT

The present invention relates to a hydrogen generator, and the purpose of the present invention is to provide a hydrogen generator wherein thermal efficiency is maximized, structural changes according to amounts of production are easily implemented, and DME is used as the main source material.

12 Claims, 2 Drawing Sheets

(51) Int. Cl.
*B01J 23/83* (2006.01)
*C01B 3/326* (2026.01)

(56) References Cited

FOREIGN PATENT DOCUMENTS

| | | | |
|---|---|---|---|
| JP | 2008-007371 | A | 1/2008 |
| JP | 2010-069453 | A | 4/2010 |
| JP | 2010-277858 | A | 12/2010 |

HYDROGEN GENERATOR

TECHNICAL FIELD

Cross Reference to Related Applications

The present application is a National Stage filing of PCT Application No. PCT/KR2022/003807 filed Mar. 18, 2022, entitled “Hydrogen Generator”, which claims the benefit of priority based on Korean Patent Application No. 10-2021-0040163 filed on Mar. 29, 2021, the entire disclosure of which is incorporated as a part of this specification The present disclosure relates to a hydrogen generator, and relates to a hydrogen generator which maximizes thermal efficiency and can be easily changed in structure according to production volume, and uses DME as a main raw material.

BACKGROUND ART

‘Hydrogen energy’ is attracting attention as one of the next-generation energy sources. Hydrogen is regarded as an eco-friendly fuel that can replace fossil fuels such as coal and oil because it does not emit pollutants even after combustion. According to the Hydrogen Council, the global hydrogen market is expected to grow to $2.5 trillion by 2050, accounting for 18% of total energy demand. Hydrogen can be applied to various fields, such as a source of electricity, cooling and heating for homes and buildings, and fuel for hydrogen fuel cell-based hydrogen vehicles.

To this end, even in a hydrogen production system, an eco-friendly process and production device that maximize the efficiency of energy used for production are required.

DISCLOSURE OF THE INVENTION

Technical Goals

The present disclosure relates to a hydrogen generator, and is to provide a hydrogen generator that maximizes thermal efficiency, can be easily changed in structure according to production volume, and uses DME as a main raw material.

Technical objects to be achieved by the present disclosure are not limited to the technical objects mentioned above, and other technical objects not mentioned will be clearly understood by those skilled in the art from the following description.

Technical Solutions

A hydrogen generator according to the present disclosure may include: a first heating furnace in which a first combustion part is provided at a lower end and a first heating space is formed at an upper part of the first combustion part; a second heating furnace in which a second combustion part is provided at a lower end and a second heating space is formed at an upper part of the second combustion part; a third heating furnace in which a third combustion part is provided at a lower end and a third heating space is formed at an upper part of the third combustion part; a first exhaust passage for delivering combustion gas of the first heating space to the second heating space; a second exhaust passage for delivering combustion gas of the second heating space to the third heating space; and a reforming reaction unit positioned across the first heating space, the second heating space, and the third heating space by penetrating sidewalls of the first heating furnace, the second heating furnace, and the third heating furnace.

Advantageous Effects

A hydrogen generator according to the present disclosure includes a systematic and integral multi-layered polygonal reforming reaction part, and may maximize thermal efficiency by utilizing waste heat and may be easily changed in structure according to hydrogen production volume by modularizing a plurality of subdivided combustion parts and combustion chambers.

In the hydrogen generator of the present disclosure, since the reforming reaction part is provided in a polygonal shape, a heat exchange area may be maximized, thereby increasing energy efficiency in hydrogen production.

The hydrogen generator of the present disclosure may maximize recovery of waste heat and exhibit a high level of energy efficiency in operating the device.

BEST MODE FOR CARRYING OUT THE INVENTION

Figure 1:
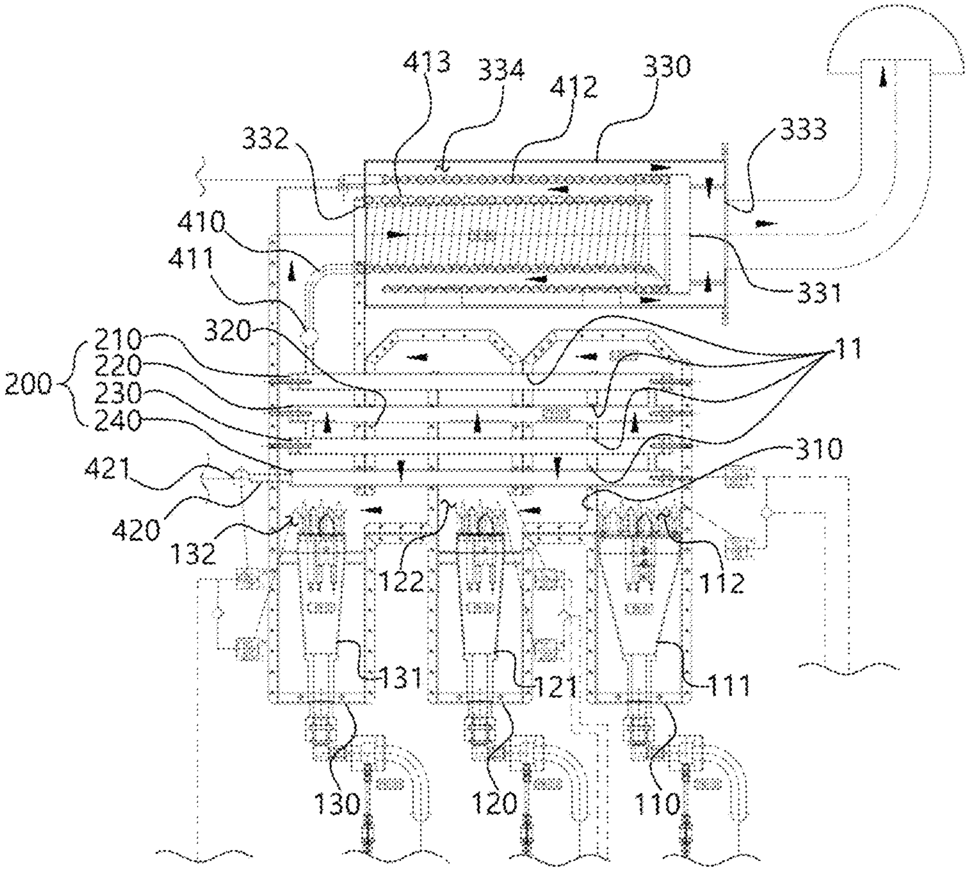
FIG. 1 is a cross-sectional view illustrating a hydrogen generator of the present disclosure.

A hydrogen generator of the present disclosure may include,

- a first heating furnace in which a first combustion part is provided at a lower end and a first heating space is formed at an upper part of the first combustion part;
- a second heating furnace in which a second combustion part is provided at a lower end and a second heating space is formed at an upper part of the second combustion part;
- a third heating furnace in which a third combustion part is provided at a lower end and a third heating space is formed at an upper part of the third combustion part;
- a first exhaust passage for delivering combustion gas of the first heating space to the second heating space;
- a second exhaust passage for delivering combustion gas of the second heating space to the third heating space; and
- a reforming reaction unit positioned across the first heating space, the second heating space, and the third heating space by penetrating sidewalls of the first heating furnace, the second heating furnace, and the third heating furnace.

In the hydrogen generator of the present disclosure, the reforming reaction unit may include,

- a first reforming reaction part connected to a raw material supply pipe for supplying DME;
- a second reforming reaction part for receiving an effluent from the first reforming reaction part and disposed below the first reforming reaction part;
- a third reforming reaction part for receiving an effluent from the second reforming reaction part and disposed below the second reforming reaction part; and
- a fourth reforming reaction part for receiving an effluent from the third reforming reaction part, which is disposed below the third reforming reaction part and connected to a hydrogen discharge pipe for discharging produced hydrogen.

To an upper end of the third heating furnace of the hydrogen generator of the present disclosure, an exhaust duct inside which an exhaust space for exhausting combustion gas of the third heating space to an outside is formed, may be connected, and the raw material supply pipe may be inserted into the exhaust space of the exhaust duct from the outside and connected to the first reforming reaction part in the third heating space through the exhaust space.

The reforming reaction unit of the hydrogen generator of the present disclosure may further include,

- a first connection passage connecting the first reforming reaction part and the second reforming reaction part in the first heating space;
- a second connection passage connecting the second reforming reaction part and the third reforming reaction part in the third heating space; and
- a third connection passage connecting the third reforming reaction part and the fourth reforming reaction part in the first heating space.

In the hydrogen generator of the present disclosure, the hydrogen discharge pipe connected to the fourth reforming reaction part in the third heating space may be connected to an external hydrogen storage system or a hydrogen fuel cell by penetrating the sidewall of the third heating furnace.

The hydrogen generator of the present disclosure may further include a preheating part for exchanging heat between the raw material supply pipe before being inserted into the exhaust space and the hydrogen discharge pipe extending to the outside of the third heating space.

In the hydrogen generator of the present disclosure, a plurality of the reforming reaction units may be provided, the raw material supply pipe may include a raw material supply manifold simultaneously connected to the plurality of reforming reaction units, and the hydrogen discharge pipe may include a hydrogen discharge manifold simultaneously connected to the plurality of reforming reaction units, wherein the raw material supply manifold may be located in the third heating space, and the hydrogen discharge manifold may be located upstream of the preheating part.

In the hydrogen generator of the present disclosure, a first section of the raw material supply pipe inserted into the exhaust space may be wound into a cylindrical shape having a first diameter to form a first coil, a second section of the raw material supply pipe downstream of the first section before being inserted from the third heating space may be wound into a cylindrical shape having a second diameter shorter than the first diameter to form a second coil, and the second coil may be located inside the first coil so that an outer circumferential surface of the second coil faces an inner circumferential surface of the first coil while they are spaced apart.

In the hydrogen generator of the present disclosure, the exhaust duct may be provided with a combustion gas inlet through which the combustion gas exhausted from the third heating space inflows and a combustion gas exhaust port through which combustion gas of the exhaust space is exhausted.

In the hydrogen generator of the present disclosure, an outer circumferential surface of the first coil may be spaced apart from an inner surface of the exhaust duct, one end of the first coil in a longitudinal direction may protrude more than one end of the second coil, the other end of the second coil may protrude more than the other end of the first coil, a blocking plate may be coupled to the one end of the first coil, and the other end of the second coil may be coupled to the inner surface of the exhaust duct in which the combustion gas inlet is formed so as to face the combustion gas inlet.

In the hydrogen generator of the present disclosure, the first reforming reaction part, the second reforming reaction part, and the third reforming reaction part may be formed in a cuboid rod pipe shape.

In the hydrogen generator of the present disclosure, the first reforming reaction part, the second reforming reaction part, and the third reforming reaction part may be filled with a $CuCe/\gamma\text{-}Al_2O_3$ catalyst.

MODES FOR CARRYING OUT THE INVENTION

Hereinafter, embodiments according to the present disclosure will be described in detail with reference to the accompanying drawings. In this process, the size or shape of the components shown in the drawings may be exaggerated for clarity and convenience of description. In addition, terms specifically defined in consideration of the configuration and operation of the present disclosure may vary according to the intention or practice of users or operators. Definitions of these terms should be made based on the content throughout this specification.

In the description of the present disclosure, it should be noted that the orientation or positional relationship indicated by the terms "center", "up", "down", "left", "right", "vertical", "horizontal", "inside", "outside", etc., is based on the orientation or positional relationship shown in the drawings, or the orientation or positional relationship that is usually placed when using the product of the present disclosure, and is intended only for explanation and brief description of the present disclosure, and is not to be construed as limiting the present disclosure as it does not suggest or imply that the device or element shown must necessarily be configured or operated in a specific orientation with a specific orientation.

Figure 2:
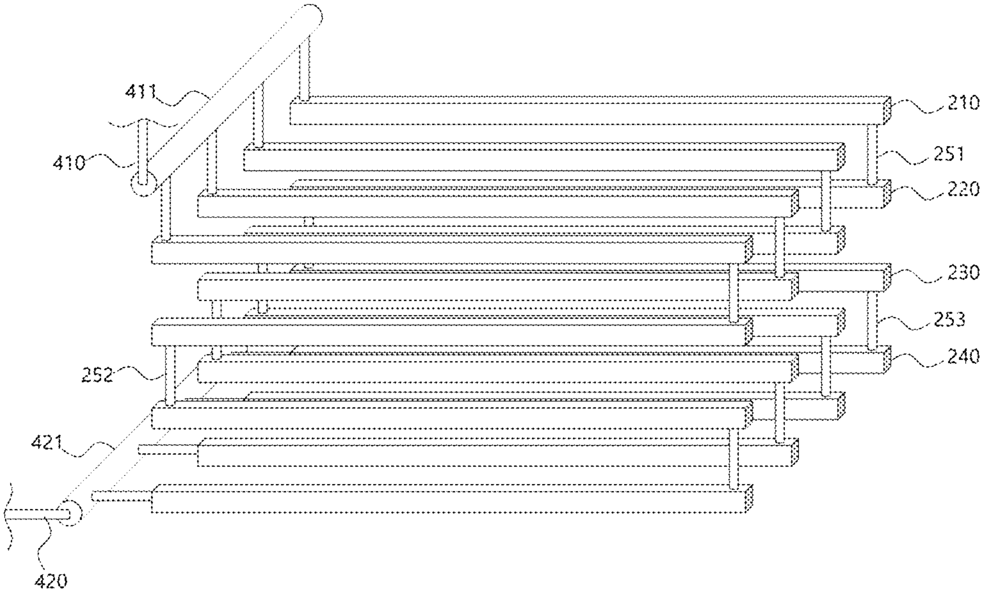
FIG. 2 is a perspective view illustrating a plurality of reforming reaction units.
Figure 3:
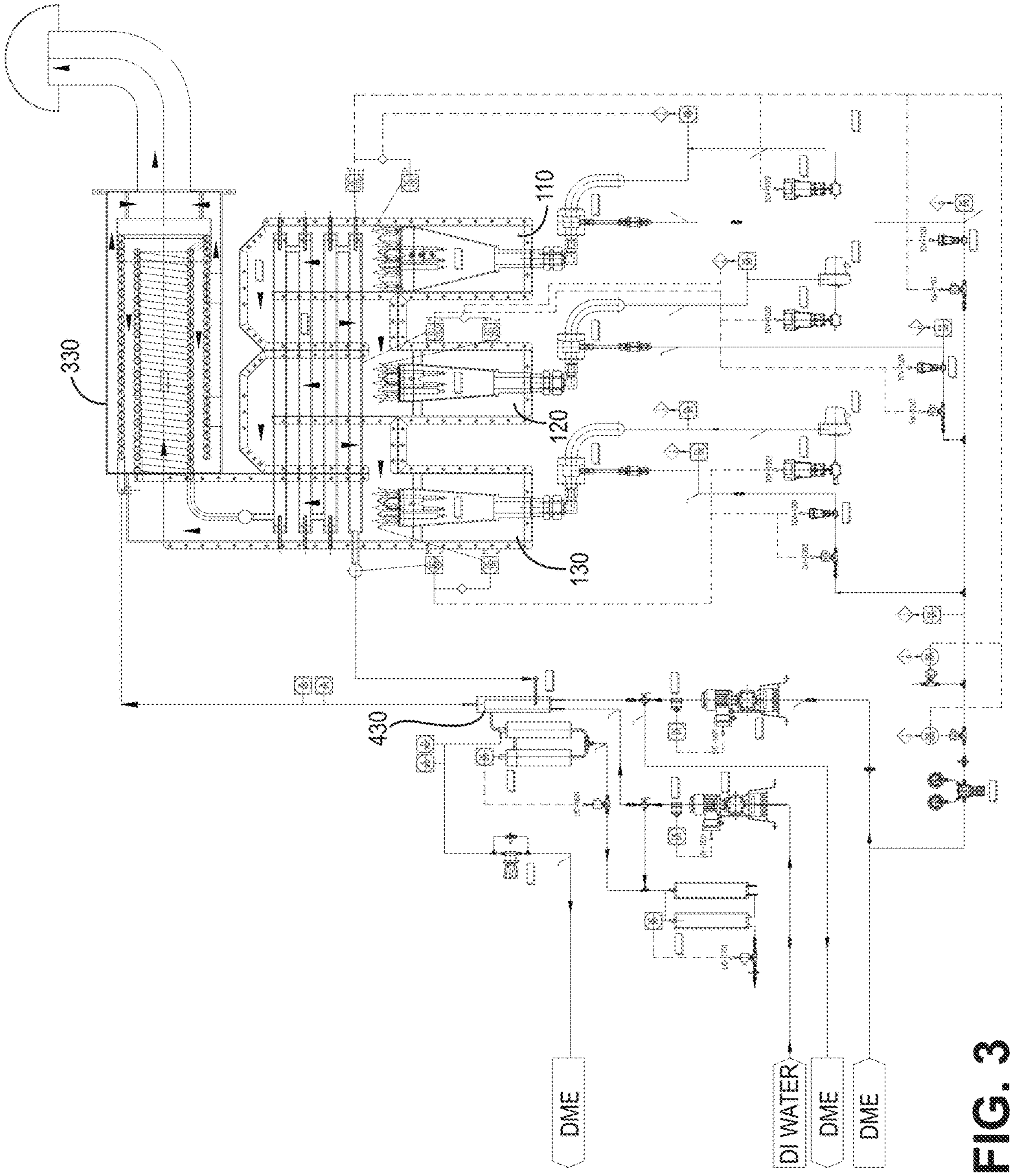
FIG. 3 is a system diagram illustrating a hydrogen generator using a hydrogen generator of the present disclosure.

FIG. 1 is a cross-sectional view illustrating a hydrogen generator of the present disclosure. FIG. 2 is a perspective view illustrating a plurality of reforming reaction units 200. FIG. 3 is a system diagram illustrating a hydrogen generator using a hydrogen generator of the present disclosure.

Hereinafter, with reference to FIGS. 1 to 3, the hydrogen generator of the present disclosure will be described in detail.

As shown in FIG. 1, the hydrogen generator of the present disclosure may include,

- a first heating furnace 110 in which a first combustion part 111 is provided at a lower end and a first heating space 112 is formed at an upper part of the first combustion part 111;
- a second heating furnace 120 in which a second combustion part 121 is provided at a lower end and a second heating space 122 is formed at an upper part of the second combustion part 121;
- a third heating furnace 130 in which a third combustion part 131 is provided at a lower end and a third heating space 132 is formed at an upper part of the third combustion part 131;
- a first exhaust passage 310 for delivering combustion gas of the first heating space 112 to the second heating space 122;
- a second exhaust passage 320 for delivering combustion gas of the second heating space 122 to the third heating space 132; and the reforming reaction unit 200 positioned across the first heating space 112, the second heating space 122, and the third heating space 132 by penetrating sidewalls of the first heating furnace 110, the second heating furnace 120, and the third heating furnace 130.

The first combustion part 111, the second combustion part 121, and the third combustion part 131 may be metal fiber burners or the like. The first combustion part 111, the second combustion part 121, and the third combustion part 131 may supply heat to the reforming reaction unit 200 in different proportions, for example, the first combustion part 111 may supply 50% of the total heat, the second combustion part 121 may supply 30% of the total heat, and the third combustion part 131 may supply 20% of the total heat.

The first combustion part 111 may located at the lower side of the first heating space 112, the second combustion part 121 may be located at the lower side of the second heating space 122, and the third combustion part 131 may be located at the lower side of the third heating space 132.

One end of the first exhaust passage 310 may be connected to the upper end of the first heating space 112, so that the combustion gas moved to the upper part of the first heating space 112 can be delivered to the first exhaust passage 310. The other end of the first exhaust passage 310 may be connected to the lower end of the second heating space 122, so as to inject the combustion gas delivered from the first heating space 112 into the lower part of the second heating space 122.

One end of the second exhaust passage 320 may be connected to the upper end of the second heating space 122, so that the combustion gas moved to the upper part of the second heating space 122 can be delivered to the second exhaust passage 320. The other end of the second exhaust passage 320 may be connected to the lower end of the third heating space 132, so as to inject the combustion gas delivered from the second heating space 122 into the lower part of the third heating space 132.

In other words, in the first heating furnace 110, the second heating furnace 120, and the third heating furnace 130, the combustion gas may flow from the lower side to the upper side, and may flow from the upper side to the lower side in the first exhaust passage 310 and the second exhaust passage 320.

The first heating furnace 110 may be disposed at a position facing one side wall of the second heating furnace 120 with the first exhaust passage 310 therebetween, and the third heating furnace 130 may be disposed at a position facing the other side wall of the second heating furnace 120 with the second exhaust passage 320 therebetween. Specifically, along the first direction, which is a direction horizontal to the ground, [first heating furnace 110]-[first exhaust passage 310]-[second heating furnace 120]-[second exhaust passage 320]-[third heating furnace 130] may be disposed in this order.

One side wall of the first exhaust passage 310 may be shared with the first heating furnace 110, the other side wall of the first exhaust passage 310 may be shared with the second heating furnace 120, one side wall of the second exhaust passage 320 may be shared with the second heating furnace 120, and the other side wall of the second exhaust passage 320 may be shared with the third heating furnace 130.

The wall separating the first heating furnace 110, the second heating furnace 120, the third heating furnace 130, the first exhaust passage 310, and the second exhaust passage 320 may be formed as a baffle.

As shown in FIGS. 1 and 2, the reforming reaction unit 200 may include,

- a first reforming reaction part 210 connected to a raw material supply pipe 410 for supplying DME;
- a second reforming reaction part 220 for receiving an effluent from the first reforming reaction part 210 and disposed below the first reforming reaction part 210;
- a third reforming reaction part 230 for receiving an effluent from the second reforming reaction part 220 and disposed below the second reforming reaction part 220; and
- a fourth reforming reaction part 240 for receiving an effluent from the third reforming reaction part 230, which is disposed below the third reforming reaction part 230 and connected to a hydrogen discharge pipe 420 for discharging produced hydrogen.

The hydrogen generator of the present disclosure may use DME as a raw material supplied to the raw material supply pipe 410 and as a fuel for operating the first combustion part 111 to the third combustion part 131. DME has a molecular structure of $CH_3OCH_3$, which is a simple ether form, and is a chemical substance that exists as a liquid under mild conditions. DME is a stable compound that does not form peroxides even when exposed to air for a long time, and is inert and non-corrosive. In addition, DME is a colorless gas harmless to the human body because it is not carcinogenic and anesthetic unlike diethyl ether which has strong anesthetic properties, has physical properties similar to LPG, so it can be stored and transported in the same way, and has a higher calorific value than methane and has no sulfur content, so it is highly valuable as a fuel. Plants fueled by DME may have a number of advantages from an environmental point of view compared to conventional combustion plants.

In other words, since the hydrogen generator of the present disclosure produces hydrogen through DME reforming and simultaneously produces heat for a reforming reaction by using DME as a combustion fuel, generation of air pollutants can be minimized.

In the raw material supply pipe 410, DME and water may be mixed and supplied in a gaseous state.

The reforming reaction unit 200 may have a four-layered structure, and the raw material injected from the raw material supply pipe 410 may be injected into the reforming reaction unit 200 and may be moved to the lower layer as the process progresses.

The first reforming reaction part 210, the second reforming reaction part 220, and the third reforming reaction part 230 may be formed in a cuboid rod pipe shape. The first reforming reaction part 210, the second reforming reaction part 220, and the third reforming reaction part 230 may be disposed across the first heating space 112, the second heating space 122, and the third heating space 132 by penetrating the penetration hole 11 formed on the wall of the first heating furnace 110, the second heating furnace 120, the third heating furnace 130, the first exhaust passage 310 and the second exhaust passage 320.

The first reforming reaction part 210, the second reforming reaction part 220, and the third reforming reaction part 230 may be filled with a $CuCe/\gamma\text{-}Al_2O_3$ catalyst.

As shown in FIG. 2, the reforming reaction unit 200 may further include,

- a first connection passage 251 connecting the first reforming reaction part 210 and the second reforming reaction part 220 in the first heating space 112;

a second connection passage 252 connecting the second reforming reaction part 220 and the third reforming reaction part 230 in the third heating space 132; and a third connection passage 253 connecting the third reforming reaction part 230 and the fourth reforming reaction part 240 in the first heating space 112.

As described above, by disposing the first connection passage 251, the second connection passage 252, and the third connection passage 253, the raw material injected into the reforming reaction unit 200 may move to the lower layer while reciprocating through the first heating space 112, the second heating space 122, and the third heating space 132 as the process progresses.

As shown in FIG. 3, the hydrogen discharge pipe 420 connected to the fourth reforming reaction part 240 in the third heating space 132 may be connected to an external hydrogen storage system or a hydrogen fuel cell by penetrating the sidewall of the third heating furnace 130. A preheating part 430 for exchanging heat between the raw material supply pipe 410 before being inserted into the exhaust space 334 and the hydrogen discharge pipe 420 extending to the outside of the third heating space 132 may be further included. In other words, DME which is a raw material, may be preheated by receiving heat from produced hydrogen before being supplied to the reforming reaction unit 200.

As shown in FIG. 1, to the upper end of the third heating furnace 130, an exhaust duct 330 inside which an exhaust space 334 for exhausting combustion gas of the third heating space 132 to the outside is formed, may be connected, and the raw material supply pipe 410 may be inserted into the exhaust space 334 of the exhaust duct 330 from the outside and connected to the first reforming reaction part 210 in the third heating space 132 through the exhaust space 334. The raw material, DME may be preheated once more by exhaust gas exhausted to the outside before being supplied to the reforming reaction unit 200.

In other word, DME supplied along the raw material supply pipe 410 may be preheated first in the preheating part 430 and secondarily preheated while passing through the exhaust space 334.

A first section of the raw material supply pipe 410 inserted into the exhaust space 334 may be wound into a cylindrical shape having a first diameter to form a first coil 412, a second section of the raw material supply pipe 410 downstream of the first section before being inserted from the third heating space 132 may be wound into a cylindrical shape having a second diameter shorter than the first diameter to form a second coil 413, and the second coil 413 may be located inside the first coil 412 so that an outer circumferential surface of the second coil 413 faces an inner circumferential surface of the first coil 412 while they are spaced apart.

The exhaust duct may be provided with a combustion gas inlet 332 through which the combustion gas exhausted from the third heating space 132 inflows and a combustion gas exhaust port 333 through which combustion gas of the exhaust space 334 is exhausted. The outer circumferential surface of the first coil 412 may be spaced apart from the inner surface of the exhaust duct, one end of the first coil 412 in a longitudinal direction may protrude more than one end of the second coil 413, the other end of the second coil 413 may protrude more than the other end of the first coil 412, a blocking plate 331 may be coupled to the one end of the first coil 412, and the other end of the second coil 412 may be coupled to the inner surface of the exhaust duct 330 in which the combustion gas inlet 332 is formed so as to face the combustion gas inlet 332. The diameter of the combustion gas inlet 332 may be less than or equal to the second diameter.

With the above structure, the combustion gas introduced into the exhaust duct 330 may pass through the center of the second coil 413, the combustion gas passed through the second coil 413 may pass through the space formed by the outer circumferential surface of the second coil 413 and the inner circumferential surface of the first coil 412 facing each other, and then pass through the combustion gas exhaust port 333 to be discharged to the outside.

As shown in FIG. 2, the plurality of reforming reaction units 200 may be provided, the raw material supply pipe 410 may include a raw material supply manifold 411 simultaneously connected to the plurality of reforming reaction units 200, and the hydrogen discharge pipe 420 may include a hydrogen discharge manifold 421 simultaneously connected to the plurality of reforming reaction units 200.

As shown in FIGS. 1 and 3, the raw material supply manifold 411 may be located in the third heating space 132, and the hydrogen discharge manifold 421 may be located upstream of the preheating part 430.

Although embodiments according to the present disclosure have been described above, these are only exemplary, and those skilled in the art will understand that various modifications and embodiments of equivalent range are possible therefrom. Therefore, the true technical protection scope of the present disclosure should be defined by the following claims.

Explanation of Symbols

110 . . . First heating furnace 111 . . . First combustion part
112 . . . First heating space 120 . . . Second heating furnace
121 . . . Second combustion part 122 . . . Second heating space
130 . . . Third heating furnace 131 . . . Third combustion part
132 . . . Third heating space 200 . . . Reforming reaction unit
210 . . . First reforming reaction part 220 . . . Second reforming reaction part
230 . . . Third reforming reaction part 240 . . . Fourth reforming reaction part
251 . . . First connection passage 252 . . . Second connection passage
253 . . . Third connection passage
310 . . . First exhaust passage 320 . . . Second exhaust passage
330 . . . Exhaust duct 331 . . . Blocking plate
332 . . . Combustion gas inlet 333 . . . Combustion gas exhaust port
410 . . . Raw material supply pipe 411 . . . Raw material supply manifold
412 . . . First coil 413 . . . Second coil
420 . . . Hydrogen discharge pipe 421 . . . Hydrogen discharge manifold
430 . . . Preheating part 11 . . . Penetration hole

Industrial Applicability

A hydrogen generator according to the present disclosure includes a systematic and integral multi-layered polygonal reforming reaction part, and may maximize thermal efficiency by utilizing waste heat and may be easily changed in structure according to hydrogen production volume by modularizing a plurality of subdivided combustion parts and combustion chambers.

In the hydrogen generator of the present disclosure, since the reforming reaction part is provided in a polygonal shape, the heat exchange area may be maximized, thereby increasing energy efficiency in hydrogen production.

The hydrogen generator of the present disclosure may maximize the recovery of waste heat and exhibit a high level of energy efficiency in operating the device.

The invention claimed is:

1. A hydrogen generator comprising:

a first heating furnace in which a first combustion part is provided at a lower end and a first heating space is formed at an upper part of the first combustion part;

a second heating furnace in which a second combustion part is provided at a lower end and a second heating space is formed at an upper part of the second combustion part;

a third heating furnace in which a third combustion part is provided at a lower end and a third heating space is formed at an upper part of the third combustion part;

a first exhaust passage for delivering combustion gas of the first heating space to the second heating space;

a second exhaust passage for delivering combustion gas of the second heating space to the third heating space; and a reforming reaction unit positioned across the first heating space, the second heating space, and the third heating space by penetrating sidewalls of the first heating furnace, the second heating furnace, and the third heating furnace.

2. The hydrogen generator of claim 1, wherein the reforming reaction unit comprises:

a first reforming reaction part connected to a raw material supply pipe for supplying DME;

a second reforming reaction part for receiving an effluent from the first reforming reaction part and disposed below the first reforming reaction part;

a third reforming reaction part for receiving an effluent from the second reforming reaction part and disposed below the second reforming reaction part; and a fourth reforming reaction part for receiving an effluent from the third reforming reaction part, which is disposed below the third reforming reaction part and connected to a hydrogen discharge pipe for discharging produced hydrogen.

3. The hydrogen generator of claim 2, wherein, to an upper end of the third heating furnace, an exhaust duct inside which an exhaust space for exhausting combustion gas of the third heating space to an outside is formed, is connected, and the raw material supply pipe is inserted into the exhaust space of the exhaust duct from the outside and connected to the first reforming reaction part in the third heating space through the exhaust space.

4. The hydrogen generator of claim 3, wherein the reforming reaction unit further comprises:

a first connection passage connecting the first reforming reaction part and the second reforming reaction part in the first heating space;

a second connection passage connecting the second reforming reaction part and the third reforming reaction part in the third heating space; and a third connection passage connecting the third reforming reaction part and the fourth reforming reaction part in the first heating space.

5. The hydrogen generator of claim 4, wherein the hydrogen discharge pipe connected to the fourth reforming reaction part in the third heating space is connected to an external hydrogen storage system or a hydrogen fuel cell by penetrating the sidewall of the third heating furnace.

6. The hydrogen generator of claim 5, further comprising:

a preheating part for exchanging heat between the raw material supply pipe before being inserted into the exhaust space and the hydrogen discharge pipe extending to the outside of the third heating space.

7. The hydrogen generator of claim 6, wherein a plurality of the reforming reaction units are provided, the raw material supply pipe comprises a raw material supply manifold simultaneously connected to the plurality of reforming reaction units, and the hydrogen discharge pipe comprises a hydrogen discharge manifold simultaneously connected to the plurality of reforming reaction units, and wherein the raw material supply manifold is located in the third heating space, and the hydrogen discharge manifold is located upstream of the preheating part.

8. The hydrogen generator of claim 3, wherein a first section of the raw material supply pipe inserted into the exhaust space is wound into a cylindrical shape having a first diameter to form a first coil, a second section of the raw material supply pipe downstream of the first section before being inserted of from the third heating space is wound into a cylindrical shape having a second diameter shorter than the first diameter to form a second coil, and the second coil is located inside the first coil so that an outer circumferential surface of the second coil faces an inner circumferential surface of the first coil while they are spaced apart.

9. The hydrogen generator of claim 8, wherein the exhaust duct is provided with a combustion gas inlet through which the combustion gas exhausted from the third heating space inflows and a combustion gas exhaust port through which combustion gas of the exhaust space is exhausted.

10. The hydrogen generator of claim 9, wherein an outer circumferential surface of the first coil is spaced apart from an inner surface of the exhaust duct, one end of the first coil in a longitudinal direction protrudes more than one end of the second coil, the other end of the second coil protrudes more than the other end of the first coil, a blocking plate is coupled to the one end of the first coil, and the other end of the second coil is coupled to the inner surface of the exhaust duct in which the combustion gas inlet is formed so as to face the combustion gas inlet.

11. The hydrogen generator of claim 2, wherein the first reforming reaction part, the second reforming reaction part, and the third reforming reaction part are formed in a cuboid rod pipe shape.

12. The hydrogen generator of claim 2, wherein the first reforming reaction part, the second reforming reaction part, and the third reforming reaction part are filled with a $CuCe/\gamma\text{-}Al_2O_3$ catalyst.

* * * * *